March 24, 1970     C. R. MEYER     3,502,327
FIBER GLASS DIVING BOARD HAVING INNER FRAME
Filed April 6, 1966
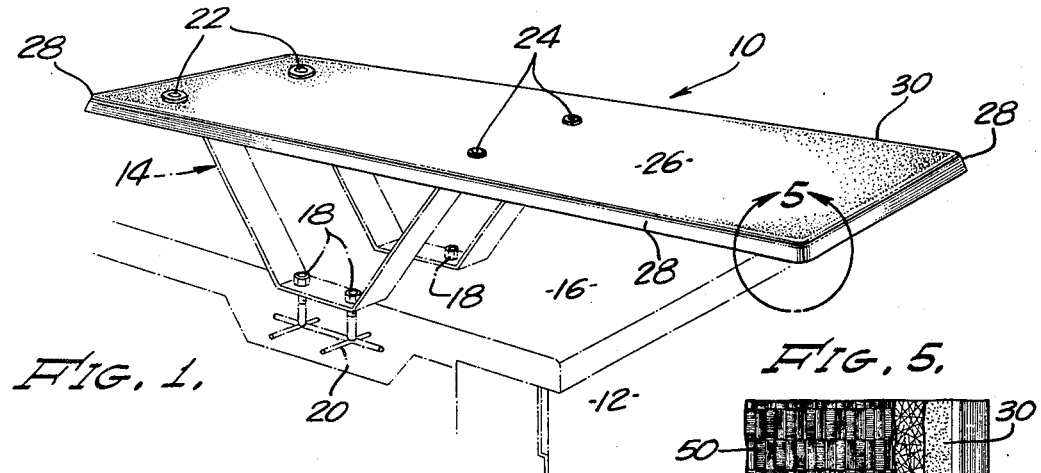
FIG. 1.
FIG. 5.
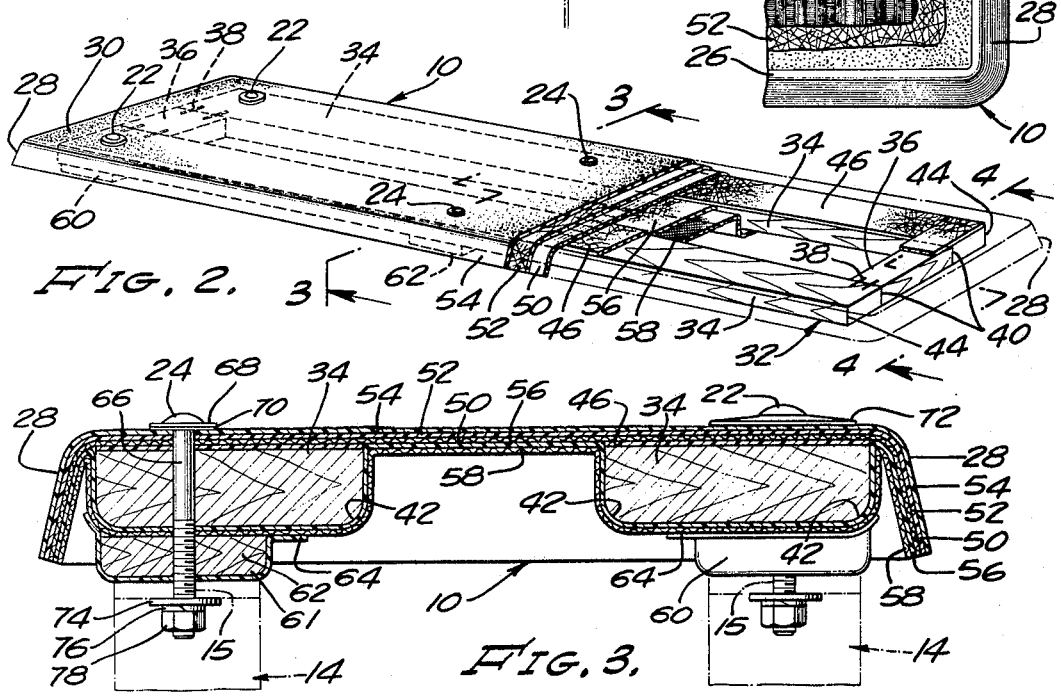
FIG. 2.
FIG. 3.
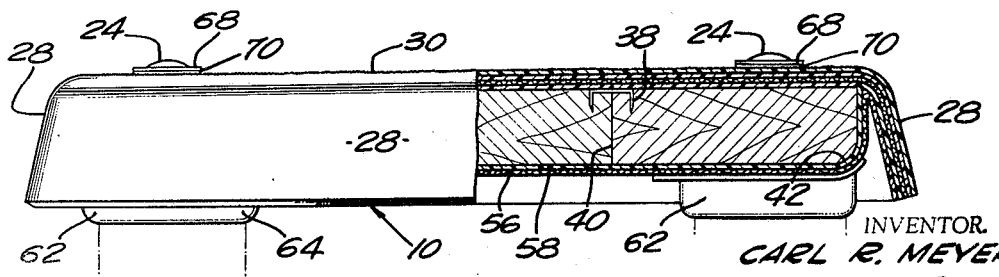
FIG. 4.
INVENTOR.
CARL R. MEYER
BY William S. Everett
AGENT

United States Patent Office 3,502,327
Patented Mar. 24, 1970

3,502,327
FIBER GLASS DIVING BOARD HAVING INNER FRAME
Carl R. Meyer, 2512 E. Vine St.,
West Covina, Calif. 91790
Filed Apr. 6, 1966, Ser. No. 540,571
Int. Cl. A63b 5/08; B32b 1/04, 3/02
U.S. Cl. 272—66                             8 Claims

ABSTRACT OF THE DISCLOSURE

A fiber glass diving board having a multi-layer composite of fiber glass materials including fiber glass mat and fiber glass woven roving in which a frame is embedded. The frame which may be made of wood comprises two spaced apart stringers of predetermined length and cross-sectional configuration. The width, or thickness of the stringers may vary along their length to vary the overall spring characteristics as desired. Butt anchor plates and fulcrum support plates are provided on the frame at the butt end and at the fulcrum support position respectively to obtain the necessary strength in these critical regions.

---

This invention relates to diving boards and the like and more particularly to a fiber glass board of novel construction.

Diving boards and similar devices have for many years been made of wood in many different ways and configurations. Some were made of solid hardwood of a preselected grade; others were made of laminated hardwoods. Some of both were tapered in thickness along the board length to give it the desired spring characteristic.

Later came the development of metallic diving boards, a typical example being one made of aluminum and in either single piece or multiple-extrusions suitably pressed together.

Both the wooden and the metallic boards have undesirable aspects. For one, the wooden board can be broken perhaps more readily than the latter one. In addition, not only does the functional environment subject the wooden board to a continuous process of slow deterioration, but also such boards are continuously exposed to nature's elements when installed as intended and this exposure further accelerates such deterioration.

A similar situation exists though perhaps to a lesser degree in the case of the metallic board. Nonetheless, metallic boards must still be protected from the corrosive action of adverse weather. In addition, metallic boards are further subjected to fatigue failures, and in the case of a multi-extrusion type of board, the possibility always exists in which the assembled extruded elements, which usually run lengthwise, may come apart or several of them may fall apart to cause the individual severe personal injury.

The introduction of fiber glass as a material for diving board construction overcame these and other disadvantages present in wooden and metallic diving boards and similar devices. The diving board to be described not only alleviates the above mentioned disadvantages but also exhibits other advantageous features heretofore not provided.

In brief, the diving board according to the invention comprises a multi-layer composite of various types of fiber glass materials in which a frame, preferably wooden, is embedded. One of these layers comprises a woven fabric having a larger number of fiber glass threads extending lengthwise rather than across the board. Such an arrangement serves to distribute the strength producing elements in places where strength is needed most. In addition, the frame is properly contoured along the lower surface thereof to assure that air entrapment between the various layers is at all times avoided and that maximum strength is therefore always realized. The tread also may be integrally formed as each particular board is constructed. This not only lowers cost and hence price but assures a life-time safety feature in which personal injuries due to slipping are forever minimized if not entirely eliminated.

According to the invention, there is provided a diving board comprising in combination frame means including spaced apart elongated stringer members disposed a predetermined distance along each side of the centerline of the board, the frame means having an upper planar surface and a lower planar surface; a first plurality of layers of fiber glass and resin materials disposed along the upper planar surface and bonded permanently thereto, the layers of the first plurality forming a coextending planar exterior surface; a second plurality of layers of fiber glass and resin materials disposed along the lower planar surface and in juxtapositional relationship with the surface opposite the exterior surface in the regions adjacent the frame means, the layers of the second plurality being bonded permanently to the lower planar surface and to the surface opposite the exterior surface; and means including spaced apart openings extending through the diving board and in alignment with the frame means for operatively mounting the diving board near a pool.

It is therefore the primary purpose and objective of the invention to provide an improved fiber glass diving board and the like.

It is another object of the invention to provide a fiber glass diving board of the type described utilizing a woven roving fiber glass layer having a substantially larger number of fiber glass threads disposed along its length relative to the width of the board.

It is still another object of the invention to provide a fiber glass diving board of the type described utilizes a wood frame embedded between two multi-layers of fiber glass materials, the lowermost edges of said frame being rounded to prevent air entrapment between the various fiber glass layers so that a board having the maximum of strength possible is provided.

It is yet another object of the invention to provide a fiber glass diving board of the type described having a built-in permanent type tread.

Another object of the invention is to provide a fiber glass diving board of the type described in which anchor and fulcrum plates are provided for safely mounting such boards and the like in operative disposition.

Yet another object of the invention is to provide a fiber glass diving board and the like that is inexpensive to manufacture, safe to use, easy to maintain, and attractive in appearance and is not susceptible to deterioration from either the elements or abusive use.

These and other objects, features and advantages of the invention will appear and be brought out more fully in the following specification reference being had to the accompanying drawing wherein:

FIGURE 1 is a perspective view of an operatively mounted diving board constructed according to the invention;

FIGURE 2 is a perspective view of the diving board of FIGURE 1 with portions of the various elements removed for explanatory purposes;

FIGURE 3 is a cross-sectional view of the diving board of FIGURES 1 and 2 taken along a line 3—3 shown in FIGURE 2;

FIGURE 4 is a partial end and cross-sectional view of the diving board of FIGURES 1 and 2 taken along a line 4—4 shown in FIGURE 2; and FIGURE 5 is a partial plan view of the diving board as shown in FIGURE 1 with successive layers partially removed to facilitate describing the diving board and the method of making the same.

Referring now to the drawing, shown there in FIGURE 1 is a perspective view of a diving board 10 constructed in accordance with the invention. The diving board 10 may be installed near a pool 12 on an undercarriage 14 of, for example, the spring base type as shown. Typically, the undercarriage 14 is fastened to a deck or slab surface 16 surrounding the pool 12 by suitable undercarriage bolts 18 which may in turn be welded to a structure 20 in jig-like fashion and embedded in the slab surface 16. To fasten the undercarriage 14 to the spring diving board 10, two butt anchor bolts 22 and two center bolts 24 are provided.

The diving board 10 includes an upper planar surface 26 having a downwardly disposed edge surface 28 co-extending along the periphery thereof. The edge surface 28 may be inclined slightly as shown in the drawing for appearance and other purposes including structural strength.

An anti-slip surface 30 comprising for example a layer of sand or similar particulate may be suitably bonded to the upper surface 26. If desired the anti-slip surface 30 may be integrally formed along with the diving board 10 as described below. In either event, adequate traction is provided to prevent personal injuries to users of the diving board 10. It should be noted that replacement of the anti-slip surface 30 is required only in the former case where a sand or sand-like material is used.

As best seen in FIGURE 2, the diving board 10 comprises a plurality of layers of fiber glass materials and various resins applied in the manner to be described to an elongated frame 32 comprising two spaced apart stringer members 34 extending along the length of the diving board 10 and interconnected at the ends thereof by the tie-block members 36.

In the embodiment shown, the frame 32 is formed from kiln-dry, vertical grain wood such as, for example, Douglas fir. If desired other grades and types of lumber may be used, slash grain being an example of a suitable substitute grade. Conceivably, the frame 32 may be formed from ferrous and non-ferrous materials properly tempered, as for example, by heat treat techniques, for co-acting with the associated fiberglass materials to provide a diving board 10 having the desired force versus deflection curve characteristics.

A stick of the size known commercially as 2 x 6 inches may be used for the stringer and the tie-block members, 34 and 36 respectively, in for example, an 8-foot board. In constructing the frame 32, the tie block members 36 are butted against the side edges facing each other near each end of the two stringer members 34 which have been cut to the appropriate and desired length. One or more staples 38 are provided at each of the four corner joints 40 to complete the frame 32. Once completed, the lower edges 42 of the stringer and tie-block members, 34 and 36 respectively, reference FIGURES 3 and 4, are rounded by, for example, a router. A one-half inch radius was found satisfactory for reasons to be described. If desired, the vertically extending outside corner edges 44 of the frame 32 may also be similarly rounded for the same reason.

As best seen in FIGURE 2, a fiber glass mat 46 is disposed along the top surface 48 of the frame 32. Over the mat 46 is provided a layer of woven roving 50 comprising a plurality of multiple-thread groupings that are woven in cloth-like fashion from fiber glass materials.

The number of fiber glass threads forming each group may vary from an equal number of threads in both the longitudinal and the transverse directions to some ratio greater than unity. I prefer to provide the longitudinal disposed groupings with a larger number of threads relative to the direction across the board 10 as illustrated in FIGURE 5 by the larger spacing between the lines running longitudinally or as seen in FIGURE 5 from left to right as compared to the spacing between the lines orthogonally directed. More specifically, the woven roving 50 may contain 75 threads in each group along the longitudinal direction and 25 in the direction across the board 10. Another acceptable ratio might be 90/10, respectively.

Next to the woven roving 50 is provided a fiber glass layer of mat 52 with a gel-coate layer 54 in turn covering the mat layer 52.

On the underneath side of the board 10 is first a layer of fiber glass mat 56 over which is disposed a fiber glass cloth layer 58, the layers 56 and 58 being positioned in place and then suitably bonded permanently to the frame 32 and to the layers 50, 52 and 54 extending over the top surface 48 of the frame 32.

Two butt anchor plates 60 and two fulcrum support plates 62 are provided on the underneath surface of the board 10 near the butt end and the fulcrum respectively as shown in FIGURE 2. The two lower edges 61 of the plates 60 and 62 are rounded in a manner similar to the rounded edges 42. A layer of the fiber glass mat 64 is disposed over the exposed areas of the plates 60 and 62 and bonded to the board 10.

For receiving the butt anchor bolts 22 and the center bolts 24, both of which may be carriage bolts of suitable length, openings 66, reference FIGURE 3, are provided in the board 10. The openings 66 extend successively through the layers 54, 52, 50 and 46, through the stringer member 34 of the frame 32, through the layers 56 and 58, through the appropriate one of the plates 60 and 62, and finally through the layer 64. To properly distribute the forces exerted on the board 10 by the bolts 22 and 24, there are provided metallic washers 72 and 68 respectively. A larger preferably cast aluminum washer may be used for the washer 72 as shown since considerably larger forces are exerted at the butt end of the board 10. To prevent moisture from entering the openings 66, a flexible washer of plastic or rubber materials is provided having the same or substantially the same diameter as the associated metallic washer 68 and 72. A conventional flat washer 74 followed by a lock washer 76 and nut 78 are provided for each of the bolts 22 and 24 to securely mount the board 10 to the spring base 14 as best seen in FIGURE 3.

It is to be noted that to mount the board 10 as a conventional diving board, only two openings 66 each disposed near the butt end and through the two butt anchor plates 60 are required since the board 10 merely rests on a fulcrum in the region of the fulcrum support plates 62. It should also be noted that the lower surfaces of the plates 60 and 62 preferably though not necessarily extend below the lower end of the edge surface 28.

In FIGURE 5, a portion of the upper planar surface 26 is shown to include the anti-slip surface 30 which extends up to a predetermined small distance from the edge surface 28. In addition, a portion of the anti-slip surface 30 is removed to show the fiberglass mat 52 which in turn is partially removed to reveal the woven roving layer 50. It is to be noted that a larger number of fibers comprise each of the groups oriented left and right in FIGURE 5 as compared to the groups extending up and down.

In constructing the board 10, a production mold not shown is first waxed thoroughly to facilitate the removal of the board 10 at the appropriate point in the process from the mold. After waxing, a coating 54 of polyester resin known as gel-coate is sprayed over the mold to a predetermined thickness of for example 12 mils. The gel-coate may be suitably colored and mixed with the proper fillers to provide the desired base color. By means of masking techniques which are well known, the board 10 may be provided with the exterior surface 26 of more than one color.

The mat layer 52 is now spread evenly over the gel-coate layer 54. Next comes the woven roving layer 50 which in turn is spread evenly over the mat layer 52. Note, if the woven roving material has more fibers in one direction than the other, the layer 50 is oriented with the larger number of fibers in the longitudinal direction. With the layers so positioned, a polyester resin of predetermined pot life is poured over the fiber glass mat 52 and woven roving 50 and allowed chemically to become a solid mass.

At this point, the mat layer 46, which is cut to the exact configuration or nearly so of the frame 32, is placed in the mold over the woven roving layer 50 and some more polyester resin spread over the mat layer 46. The frame 32 is now positioned over the mat layer 46 and suitably clamped to the mold until this new more completed assembly solidifies.

It should be pointed out that the frame 32, formed preferably of 2 x 6 inch stock of kiln-dried, vertical grain Douglas fir, is assembled by driving staples 38 across each of the corner joints 40 to attach the tie-block members 36 to the stringer members 34. After the frame 32 is stapled together, the sharp edges on one side of the frame 32 are rounded as shown by the reference numeral 42 in FIGURES 3 and 4.

In positioning the frame 32 onto the mat layer 46, the side having the rounded edges 42 is exposed. Again, time is allowed for the assembly thus far completed to solidify.

The mat layer 56 and the cloth layer 58 are then successively spread over the frame 32 and the exposed portions of the woven roving layer 50. Again, the polyester resin having the desired pot-life of for example, 6 to 15 minutes is applied over the layers 56 and 58.

The butt anchor plates 60 and the fulcrum support plates 62 are attached first by coating the underneath side of the board 10 at the proper spot with polyester resin, placing the plates 60 and 62 in position, covering the plates 60 and 62 with a layer 64 of fiber glass mat, and clamping the plates 60 and 62 to the mold until the resin kicks-off and forms a solid mass.

At this point, the assembly of fiber lgass materials, resins, frame and plates is completed and carefully removed from the mold. Curing is achieved by placing the board assembly on racks and subjecting the assembly to a temperature of approximately 150 F. degrees for a period of 1 to 2 hours. Other temperatures and appropriate time durations may be used if desired to cure at a faster or slower rate.

After the board 10 is properly cured, the side edges 28 are trimmed and sanded and the appropriate number of openings 66 are drilled. At this point, a sand tread may be provided if the production mold did not have a roughed matching tread surface coextending over the upper planar surface 26. Such a sand tread is provided by buffing the desired areas of the planar surface 26 and applying some polyester resin to the buffed areas. A sand of the desired grit is spread over the buffed areas after the resin had time to make this area tacky. The excess sand may be blown off after which a surfacing resin is sprayed over the entire sand tread to permanently adhere the sand tread to the board 10.

In the preferred method, the production mold 10 is provided with a matching tread producing surface. In this case, the built-in tread is a permanent part of the outer gel-coate layer 54. The Fero Corporation market a base resin in which are mixed organic and inorganic fillers to establish a desired grid mix and predetermined pot life. As for the polyester resin, a type known as No. 8048 by Reichhold Chemical Inc. may be used.

It should also be pointed out that the diving board 10 may be tapered along its length, if desired. This can be readily accomplished by forming the production mold accordingly. In a twelve-foot board, for example, a one-inch taper was found satisfactory, the shorter boards being tapered proportionately.

Thus, I have shown and described an improved fiber glass diving board and the like together with a method of making the same. Not only is there the unique feature of a built in tread but also there is provided a frame properly contoured to prevent air pockets and entrapments which tend to reduce the overall strength of the board. Of importance also is the utilization of a novel woven roving having more thread fibers disposed in the longitudinal direction where the need for strength is greater relative to the direction across the board. The result is a fiber glass board which is stronger, cheaper, safer, more reliable and totally weatherproof and yet attractive in appearance.

While I have herein shown and described my invention in what I have conceived to be the most practical and preferred embodiments, it is recognized that departures may be made therefrom within the scope of my invention, which is not to be limited to the details disclosed herein but is to be accorded the full scope of the claims so as to embrace any and all equivalent devices and methods.

I claim:

1. A diving board comprising in combination:
    frame means including spaced apart elongated stringer members disposed a predetermined distance along each side of the centerline of said board, said frame means having an upper planar surface and a lower planar surface;
    a first plurality of layers of fiber glass and resin materials disposed along said upper planar surface and bonded permanently thereto, the layers of said first plurality forming a co-extending planar exterior surface;
    a second plurality of layers of fiber glass and resin materials disposed along said lower planar surface and in juxtapositional relationship with the surface opposite said exterior surface in the regions adjacent said frame means, the layers of said second plurality being bonded permanently to said lower planar surface and to said surface opposite said exterior surface; and
    means including spaced apart openings extending through said diving board and in alignment with said frame means for operatively mounting said diving board near a pool.

2. The diving board in accordance with claim 1 further characterized in that said frame means includes tie-block end members for interconnecting said stringer members in fixed relationship therewith;
    in that said frame means includes rounded edges continuously disposed along both sides of said stringer members and said tie-block members;
    in that said diving board further includes plate means disposed over said second plurality of layers in alignment with said spaced apart openings and a layer of fiber glass materials covering each of said plate means and permanently bonded thereto and to said diving board along the underneath surface thereof.

3. The diving board in accordance with claim 2 further characterized in that said first and second pluralities each includes a woven layer and a mat layer of fiber glass materials, the woven layer of said first plurality and the mat layer of said second plurality being disposed nearest said frame means along said upper and lower planar surfaces thereof.

4. The diving board in accordance with claim 3 further characterized in that said exterior surface includes a tread disposed thereon and extending outwardly a predetermined distance from the sides and ends of said diving board.

5. The diving board in accordance with claim 4 further characterized in that said tread comprises an integral portion of the outermost layer of said first plurality of fiber glass and resin materials.

6. The diving board in accordance with claim 4 further characterized in that said tread comprises a sand-like substance bonded to said exterior surface.

7. A diving board of composite construction comprising a pair of spring arms of an elastic wood material extending longitudinally of the board substantially full-length in laterally spaced relation; and a cover of cured, synthetic resin-impregnated fabric material including a substantially flat body web resting upon the upper faces of said spring arms and extending across the space between said spring arms, and a pair of sheaths integrally bonded to the under side of said body web, extending longitudinally thereof, enclosing the bottom and sides of said spring arms and securing them to said body web.

8. A diving board as defined in claim 7 wherein said cover is of shallow inverted channel form, including an apron extending completely around the periphery of said body web, integral with and extending downwardly from the side and end margins of said body web, the lower edge of said apron being spaced from the sides and ends of said sheaths.

References Cited

UNITED STATES PATENTS

| | | | |
|---|---|---|---|
| 2,649,304 | 8/1953 | Ulanovsky | 272—66 |
| 2,965,529 | 12/1960 | Bright | 272—66 |
| 3,035,837 | 5/1962 | Austin | 272—66 |
| 3,074,832 | 1/1963 | Graff | 161—44 |

RICHARD C. PINKHAM, Primary Examiner

R. W. DIAZ, JR., Assistant Examiner

U.S. Cl. X.R.

161—44